United States Patent [19]

Ancona

[11] Patent Number: 5,558,237
[45] Date of Patent: Sep. 24, 1996

[54] ADAPTABLE BAKING SYSTEM

[75] Inventor: Bruce Ancona, New York, N.Y.

[73] Assignee: B. Via International Housewares, Inc., Englewood Cliffs, N.J.

[21] Appl. No.: 370,757

[22] Filed: Jan. 13, 1995

[51] Int. Cl.⁶ ........................................................ A47F 7/00
[52] U.S. Cl. ............................................ 211/133; 211/181
[58] Field of Search ..................... 211/133, 181, 211/153, 184, 182, 162, 175, 13; 249/DIG. 1; D7/43

[56] References Cited

U.S. PATENT DOCUMENTS

| | | |
|---|---|---|
| D. 265,879 | 8/1982 | Bisso . |
| 2,478,458 | 8/1949 | Carter, Sr., et al. ................ 211/181 X |
| 4,452,419 | 6/1984 | Saleeba . |
| 4,471,748 | 9/1984 | Venable . |
| 4,548,566 | 10/1985 | Renzo et al. . |
| 4,668,358 | 5/1987 | Ball . |
| 5,125,520 | 6/1992 | Kawasaki ................................ 211/133 |
| 5,147,050 | 9/1992 | Cullen . |
| 5,226,525 | 7/1993 | Dooley . |

*Primary Examiner*—Alvin C. Chin-Shue
*Assistant Examiner*—Sarah L. Purol
*Attorney, Agent, or Firm*—Henry D. Pahl, Jr.

[57] ABSTRACT

The baking system disclosed herein employs a wire rack frame which carries, between a pair of parallel side bars, a plurality of transverse bars the ends of which slidably engage the side bars. The spacing between the transverse bars may thus be manually adjusted. The system also involves a plurality of each of several differently sized pans with each of the pans being provided, on opposed sides thereof, with hook means adapted to engage a respective one of the slidable bars. Accordingly, a freely selectable group of pans can be supported on the rack during baking by appropriately spacing the transverse bars.

7 Claims, 4 Drawing Sheets

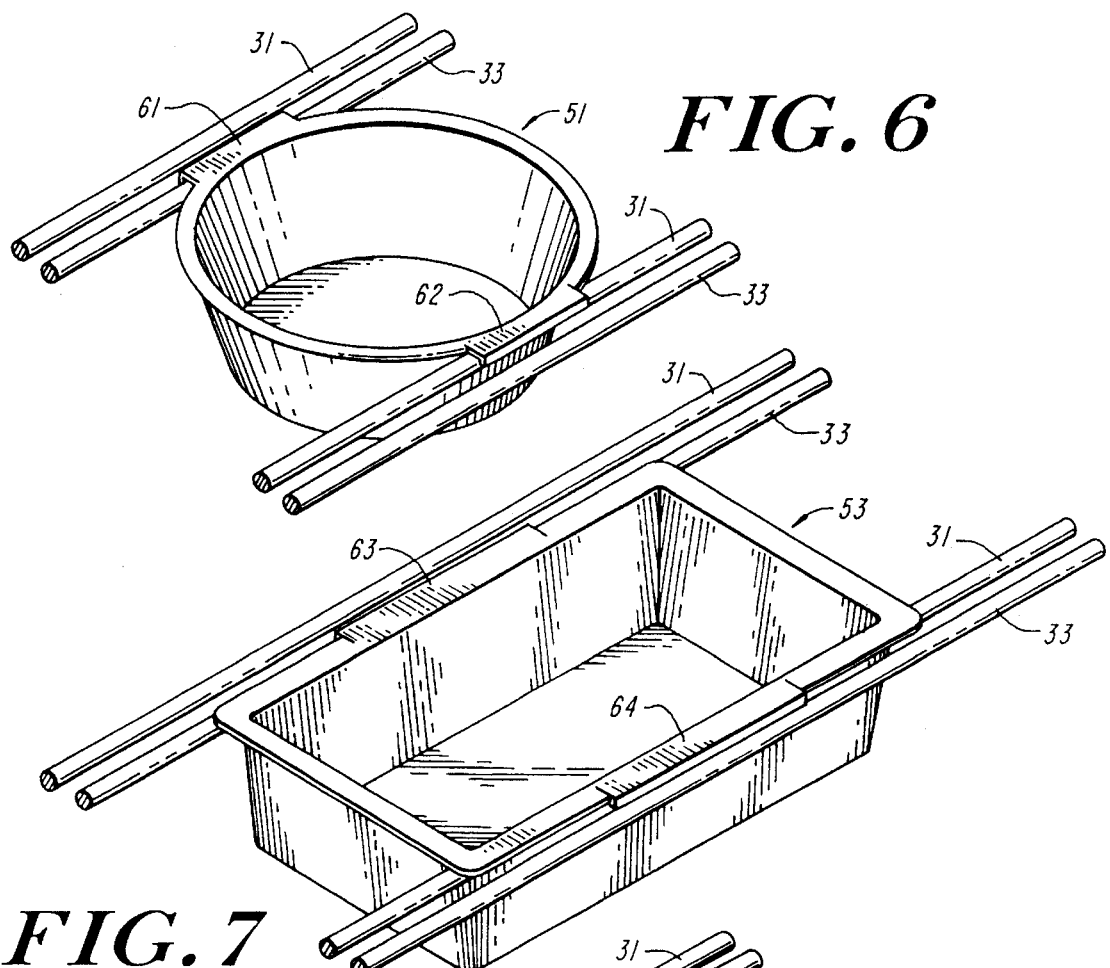
FIG. 6
FIG. 7
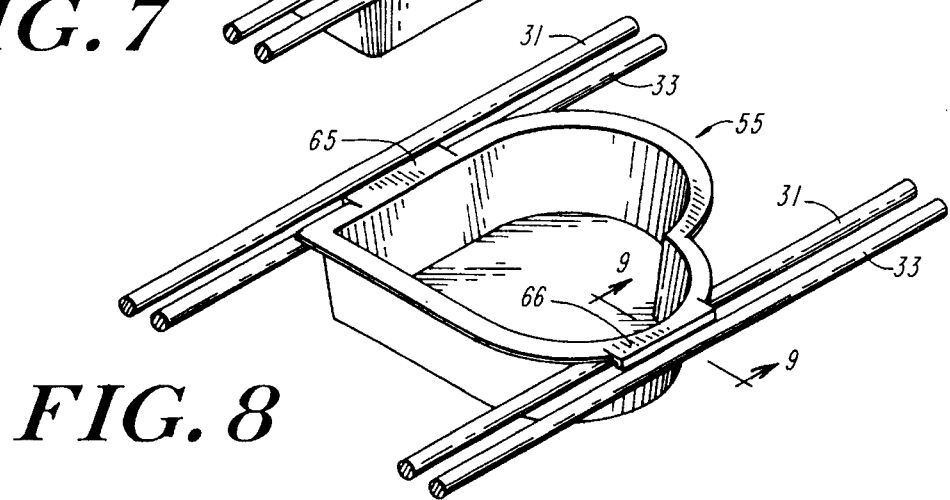
FIG. 8
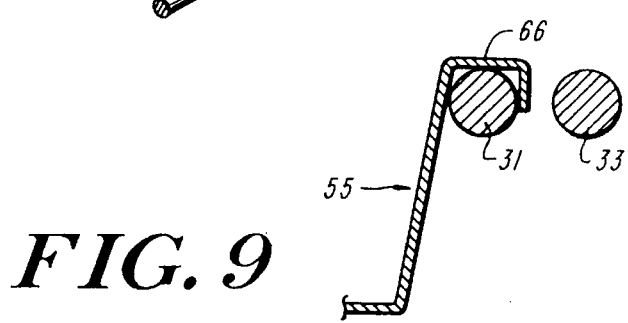
FIG. 9

ADAPTABLE BAKING SYSTEM

BACKGROUND OF THE INVENTION

The present invention relates to baking apparatus and more particularly to an adaptable baking system which facilitates the simultaneous use of a freely selectable group of pans of different sizes.

Particularly for the skilled home cook, as opposed to commercial bakers, it is often desirable to produce baked goods of different sizes and shapes during a single cooking session. While pans of differing sizes and shapes have been readily available, it has often been difficult to manage a grouping of such differently sized and shaped pans e.g., during loading or unloading of an oven. Further, as is understood by those skilled in the cooking arts, it is desirable that the cooking pans be supported during baking in such a manner that air within the oven can circulate entirely around the pan which is not possible if the pans are supported on a metal tray.

Among the several objects of the present invention, may be noted the provision of novel baking apparatus; the provision of such apparatus which permits the simultaneous usage of a freely selectable group of pans of different sizes and/or shapes; the provision of such a system which supports such a freely selectable group of pans in a manner such that air within an oven can circulate freely around each pan; the provision of such a system which is easy to use; and the provision of such a system which is highly reliable and which is of relatively simple an inexpensive construction. Other objects and features will be in part in parent and as part pointed out hereinafter.

SUMMARY OF THE INVENTION

Briefly, baking apparatus in accordance with the present invention involves a pair of horizontal parallel bars which are supported by leg means at substantially equal heights above a supporting surface. A plurality of second bars extend between the first bars transversely therereto, with the ends of the second bars being slidingly engaged with the first bars thereby to permit the spacing between the second bars to be manually adjusted. The apparatus also involves a plurality of each of several differently sized pans, each of the pans being provided, on opposite sides thereof, with hook means adapted to engage a respective one of the second bars. Accordingly, a freely selectable group of the pans can be supported between those second bars by appropriately spacing them.

BRIEF DESCRIPTION OF THE DRAWINGS

FIGS. 6–8 illustrate representative differently sized and shaped pans which cooperate with the rack of FIG. 1; and FIG. 9 is a view, in section taken substantially on the line 9—9 of FIG. 8, showing the construction of hooks employed in each of the pans.

Corresponding reference characters indicate corresponding parts throughout the several views of the drawings.

DESCRIPTION OF THE PREFERRED EMBODIMENT

Figure 1:
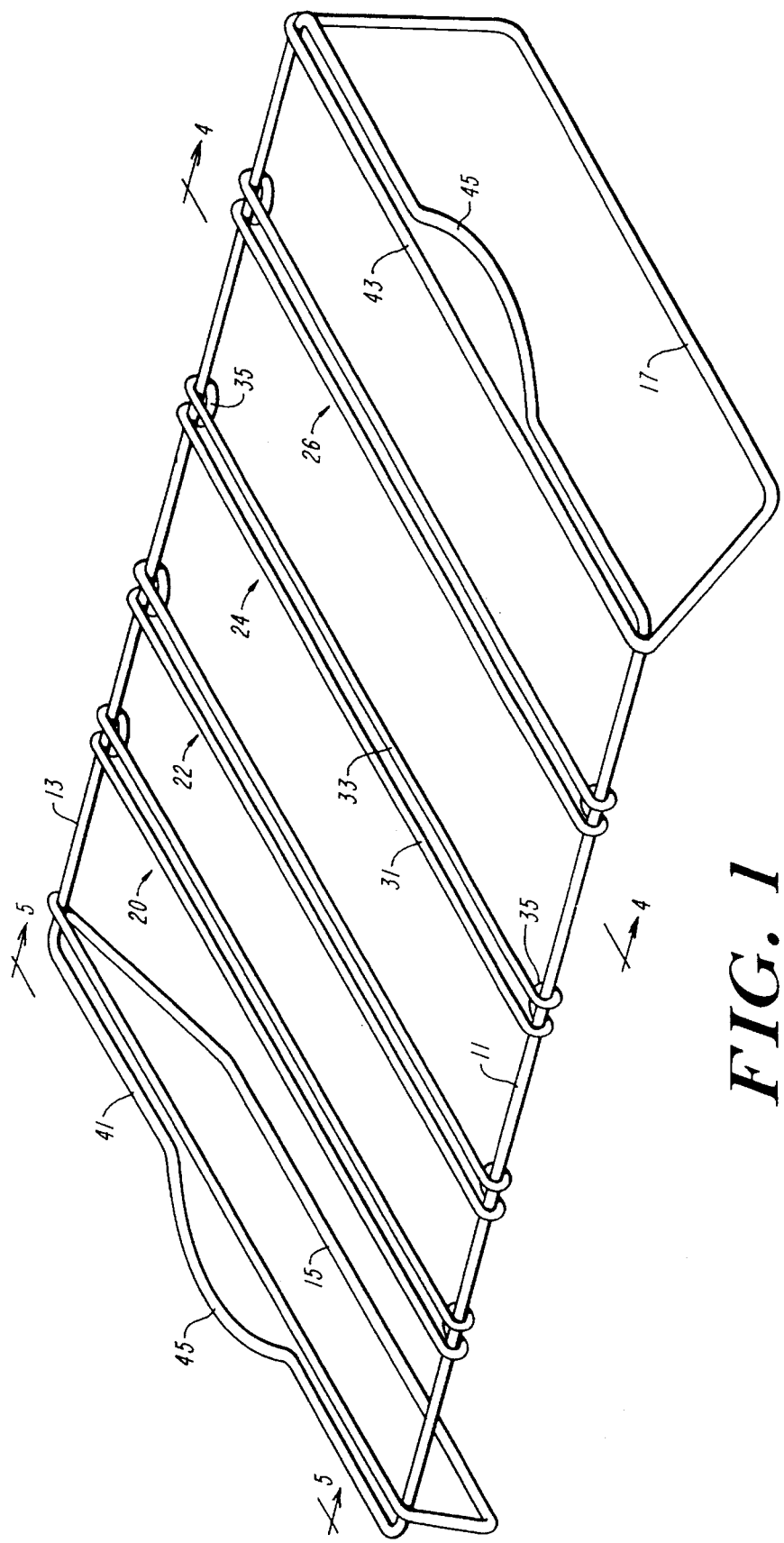
FIG. 1 is a view in perspective of a wire rack employed in the baking system of the present invention.

As indicated previously, the baking system of the present invention employs a wire rack which will support a plurality of differently sized pans. As illustrated in FIGS. 1–5, the wire rack involves a frame which includes a pair of horizontal and parallel side bars 11 and 13 together with leg members 15 and 17 which support the side bars at substantially equal heights above a supporting surface, e.g., a conventional oven rack.

The side bars 11 and 13 support a series of transverse bars 21–26 which extend between the side bars, essentially perpendicular thereto, with each transverse bar being slidable along the side bars. Preferably the slidable transverse bars 21–26 are constructed as loops of wire which provide a pair of closely spaced parallel rod portions 31 and 33 joined at each end by a rounded hook portion 35 which wraps around the respective side bar 11 and 13 to provide the sliding engagement. The provision of closely spaced rod portions minimizes rocking and twisting of the transverse bars and provides a separate rod portion for engagement with a pan on either side, as described in greater detail hereinafter.

In addition to the slidable bars, the wire rack of FIGS. 1–5, preferably also include a fixed transverse bars 41 and 43 extending between the corresponding ends of the side bars 11 and 13. These fixed transverse bars add rigidity to the wire framed structure and also provide a possible attachment point for the endmost pans in a mixed grouping of pans as described in greater detail hereinafter. The wire frame preferably also incorporates, at each end, handle members 45.

Figure 2:
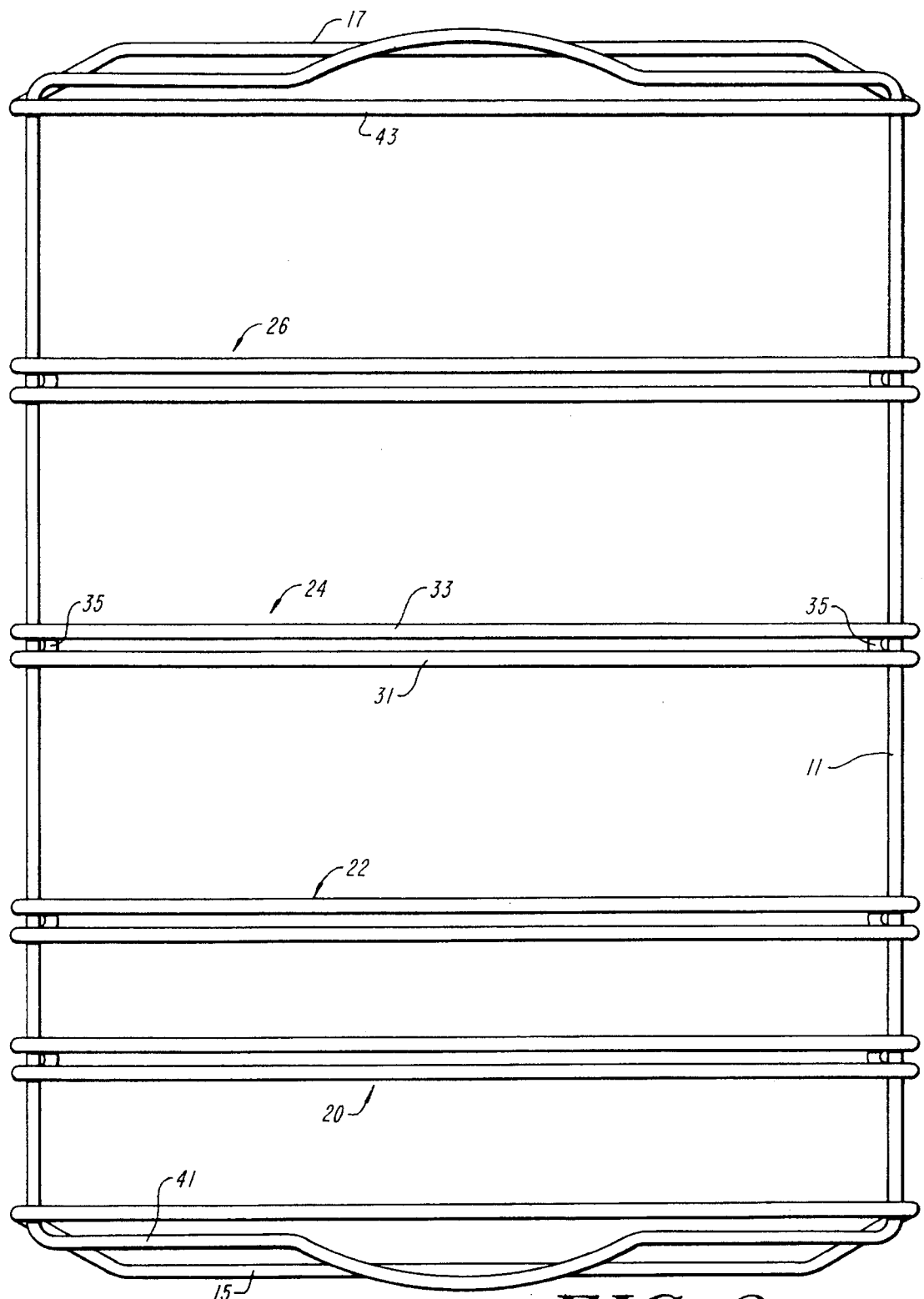
FIG. 2 is a top view of the rack of FIG. 1.
Figure 3:
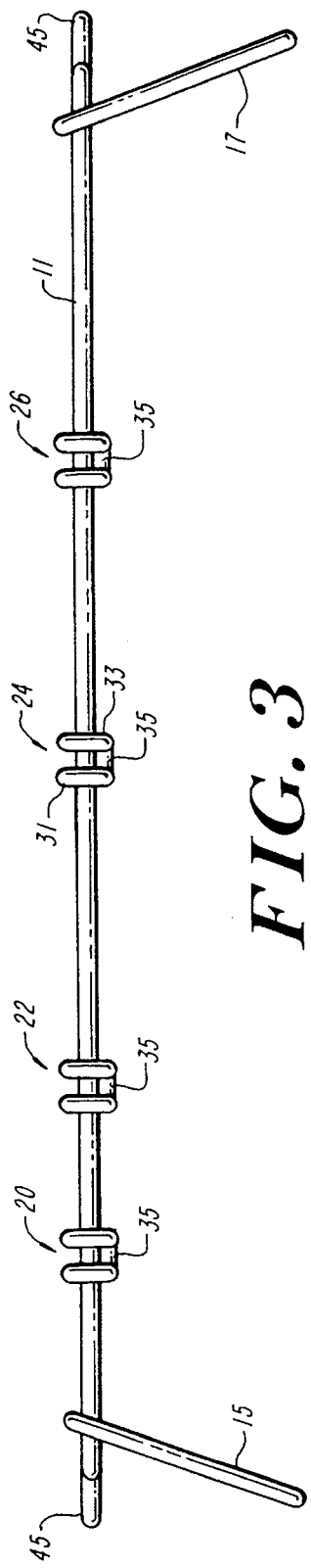
FIG. 3 is a side view of the rack of FIG. 1.
Figure 4:
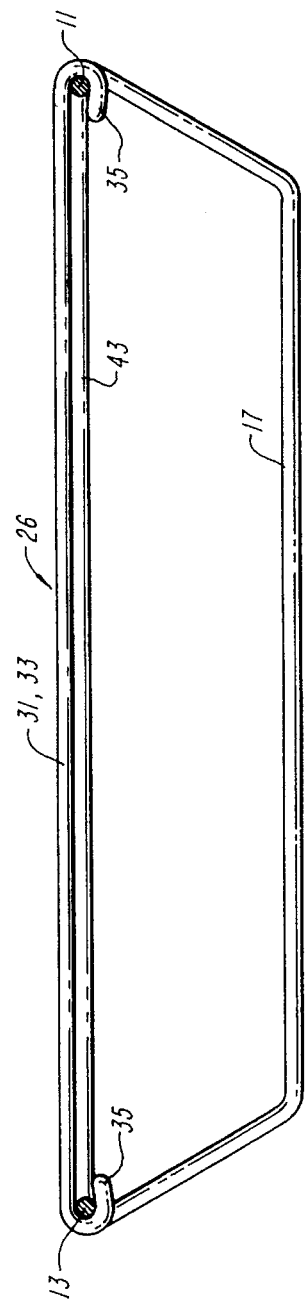
FIGS. 4 is a sectional view taken substantially on the line 4—4 of FIG. 1.
Figure 5:
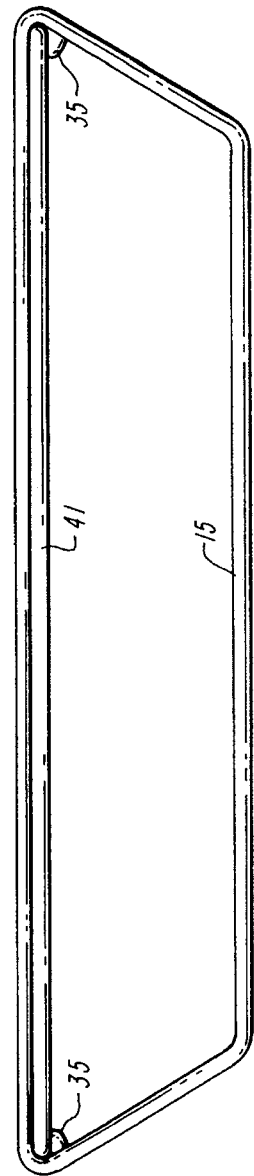
FIG. 5 is an end view of the rack of FIG. 1.

FIGS. 6–8 illustrate three differently sized and shaped pans which are usable with the rack of FIGS. 1–3. FIG. 6 illustrates a round pan 51, FIG. 7 illustrates a rectangular pan 53 and FIG. 6 illustrates a heart shaped pan 55. As will be understood, many more shapes and sizes are contemplated though not specifically illustrated herein. Each of the pans 51, 53 and 55 incorporate, on opposed sides thereof, a flange-like hook. These hooks, designated by reference characters 61–66, are adapted to engage a respective one of the transverse bars. Accordingly, a freely selectable grouping of the pans can be supported on the rack by appropriately spacing the slidable transverse bars and hanging the pans on the transverse bars, including the fixed transverse bars as appropriate.

The rack, with a variety of pans installed as illustrated, can be easily transported from a preparation area into an oven for baking and likewise can be easily removed from the oven. Further, the rack will support the pans above a base surface, so that air within the oven can circulate around each pan freely. The rack can likewise function as a cooling rack.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An apparatus for baking comprising:

a pair of horizontal, parallel, first bars;

leg means for supporting said parallel first bars at substantially equal heights above a supporting surface;

a plurality of second bars extending between said first bars transversely thereto, the ends of said second bars being slidingly engaged with said first bars thereby to permit the spacing between said second bars to be manually adjusted; and a plurality of each of several differently sized pans, each of said pans being provided, on opposed sides thereof, with hook means adapted to engage a respective one of said second bars whereby a freely selectable group of said pans can be supported between said second bars for baking by appropriately spacing said second bars.

2. An apparatus as set forth in claim 1 wherein each of said second bars comprises a pair of closely spaced parallel rod portions joined together at each end by a hook portion which wraps around the respective first bar to provide said sliding engagement.

3. An apparatus as set forth in claim 1 further comprising fixed bars extending between the corresponding ends of said first bars and adapted to receive sad hook means in manner similar to said slidable second bars.

4. An apparatus as set forth in claim 3 wherein said first bars, said leg means and said fixed bars are formed by a unitary bent wire assembly.

5. An apparatus as set forth in claim 1 further comprising an arcuate handle at each end of said first bars.

6. An apparatus for baking comprising:

a frame which provides a pair of horizontal, parallel, first bars joined at their ends by fixed transverse bars and leg means for supporting said parallel first bars and said fixed bars at substantially equal heights above a supporting surface;

a plurality of second bars extending between said first bars transversely thereto, the ends of said second bars being slidingly engaged with said first bars thereby to permit the spacing between said second bars to be manually adjusted, each of said second bars comprising a pair of closely spaced parallel rod portions joined together at each end by a hook portion which wraps around the respective first bar to provide said sliding engagement; and a plurality of each of several differently sized pans, each of said pans being provided, on opposed sides thereof, with hook means adapted to engage a respective one of said second bars whereby a freely selectable group of said pans can be supported between said second bars and fixed transverse bars for baking by appropriately spacing said second bars.

7. An apparatus as set forth in claim 6 wherein said frame is formed by a unitary bent wire assembly.

* * * * *